(12) United States Patent
Chen et al.

(10) Patent No.: US 11,430,190 B2
(45) Date of Patent: Aug. 30, 2022

(54) VIRTUAL AND REAL IMAGE FUSION METHOD, VIRTUAL AND REAL IMAGE FUSION SYSTEM AND NON-TRANSIENT COMPUTER READABLE MEDIUM

(71) Applicant: INSTITUTE FOR INFORMATION INDUSTRY, Taipei (TW)

(72) Inventors: Li-Ting Chen, Taipei (TW); Ming-Fang Weng, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 17 days.

(21) Appl. No.: 17/148,509

(22) Filed: Jan. 13, 2021

(65) Prior Publication Data

US 2022/0114789 A1   Apr. 14, 2022

(30) Foreign Application Priority Data

Oct. 14, 2020   (TW) ................................ 109135526

(51) Int. Cl.
| G06T 19/00 | (2011.01) |
| H04N 13/239 | (2018.01) |
| H04N 13/332 | (2018.01) |

(52) U.S. Cl.
CPC ......... *G06T 19/006* (2013.01); *H04N 13/239* (2018.05); *H04N 13/332* (2018.05); *G06T 2219/004* (2013.01)

(58) Field of Classification Search
None
See application file for complete search history.

(56) References Cited

U.S. PATENT DOCUMENTS

| 11,089,279 | B2 * | 8/2021 | Lee | G01S 17/89 |
| 2014/0274391 | A1 * | 9/2014 | Stafford | H04N 13/383 463/32 |
| 2017/0193687 | A1 * | 7/2017 | Lo | G06T 19/006 |
| 2020/0143524 | A1 * | 5/2020 | Selstad | G06T 3/0093 |
| 2022/0091665 | A1 * | 3/2022 | McCombe | G06T 7/50 |

FOREIGN PATENT DOCUMENTS

| TW | 202001805 A | 1/2020 |
| TW | 202022321 A | 6/2020 |

OTHER PUBLICATIONS

Tuceryan, Mihran, Yakup Gene, and Nassir Navab. "Single-point active alignment method (SPAAM) for optical see-through HMD calibration for augmented reality." Presence: Teleoperators & Virtual Environments 11.3 (2002): 259-276.*

The office action of the corresponding Taiwanese application dated Dec. 30, 2020.

* cited by examiner

*Primary Examiner* — Ryan M Gray
(74) *Attorney, Agent, or Firm* — CKC & Partners Co., LLC (57) ABSTRACT

A virtual and real image fusion method is disclosed. The method comprises the following operations: obtaining a picture of a three dimensional space by a first camera, in which the picture comprises a screen picture and a tag picture of an entity tag and the screen picture is projected on the entity tag; obtaining a corresponding point data of the entity tag on the screen picture according to the picture by a processor; obtaining a spatial correction parameter according to the corresponding point data by the processor; and displaying an image on the screen picture according to the spatial correction parameter by the processor.

18 Claims, 6 Drawing Sheets

VIRTUAL AND REAL IMAGE FUSION METHOD, VIRTUAL AND REAL IMAGE FUSION SYSTEM AND NON-TRANSIENT COMPUTER READABLE MEDIUM

CROSS-REFERENCE TO RELATED APPLICATION

This application claims the priority benefit of TAIWAN Application serial no. 109135526, filed Oct. 14, 2020, the full disclosure of which is incorporated herein by reference.

BACKGROUND

Field of Invention

The invention relates to a virtual and real image fusion method, a virtual and real image fusion system, and a non-transient computer readable medium. More particularly, the invention relates to a virtual and real image fusion method, a virtual and real image fusion system, and a non-transient computer readable medium for applying to an optically see-through head mounted display.

Description of Related Art

When the head mounted display leaves the factory, due to the difference of the screen relative to camera position/turn (external parameter), the size/angle/position of the displayer screen projected to the three dimensional space will also vary with the wearer's pupil and focal length (internal parameter). For producing the effect of superimposing the virtual image with the actual scene, performing a spatial correction is in need. The current common practice is that after the head mounted display is shipped from the factory, the user can operate the mixed reality virtual and real overlay application software by himself to obtain the personalized spatial correction parameter. However, the above-mentioned calibration method will be affected by the user's operation method and will take a long time.

SUMMARY

An aspect of this disclosure is to provide a virtual and real image fusion method. The method comprises the following operations: obtaining a picture of a three dimensional space by a first camera, in which the picture comprises a screen picture and a tag picture of an entity tag and the screen picture is projected on the entity tag; obtaining a corresponding point data of the entity tag on the screen picture according to the picture by a processor; obtaining a spatial correction parameter according to the corresponding point data by the processor, and displaying an image on the screen picture according to the spatial correction parameter by the processor.

Another aspect of this disclosure is to provide a virtual and real image fusion system. The virtual and real image fusion system includes a displayer, a first camera, and a processor. The displayer is configured to display a screen picture. The first camera is configured to obtain a picture of a three dimensional space. The picture includes a screen picture and a tag picture of an entity tag. The screen picture is projected on the entity tag. The processor is configured to obtain a corresponding point data of the entity tag on the screen picture according to the picture, to obtain a spatial correction parameter according to the corresponding point data, and to display an image on the screen picture according to the spatial correction parameter.

Another aspect of this disclosure is to provide a non-transient computer readable medium, including at least one program command configured to operate a virtual and real image fusion method, the virtual and real image fusion method includes following operations: obtaining a corresponding point data of an entity tag on a screen picture according to a picture by a processor, in which the picture comprises the screen picture and a tag picture of the entity tag, in which the screen picture is projected on the entity tag; obtaining a spatial correction parameter according to the corresponding point data; and displaying an image on the screen picture according to the spatial correction parameter.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Figure 1:
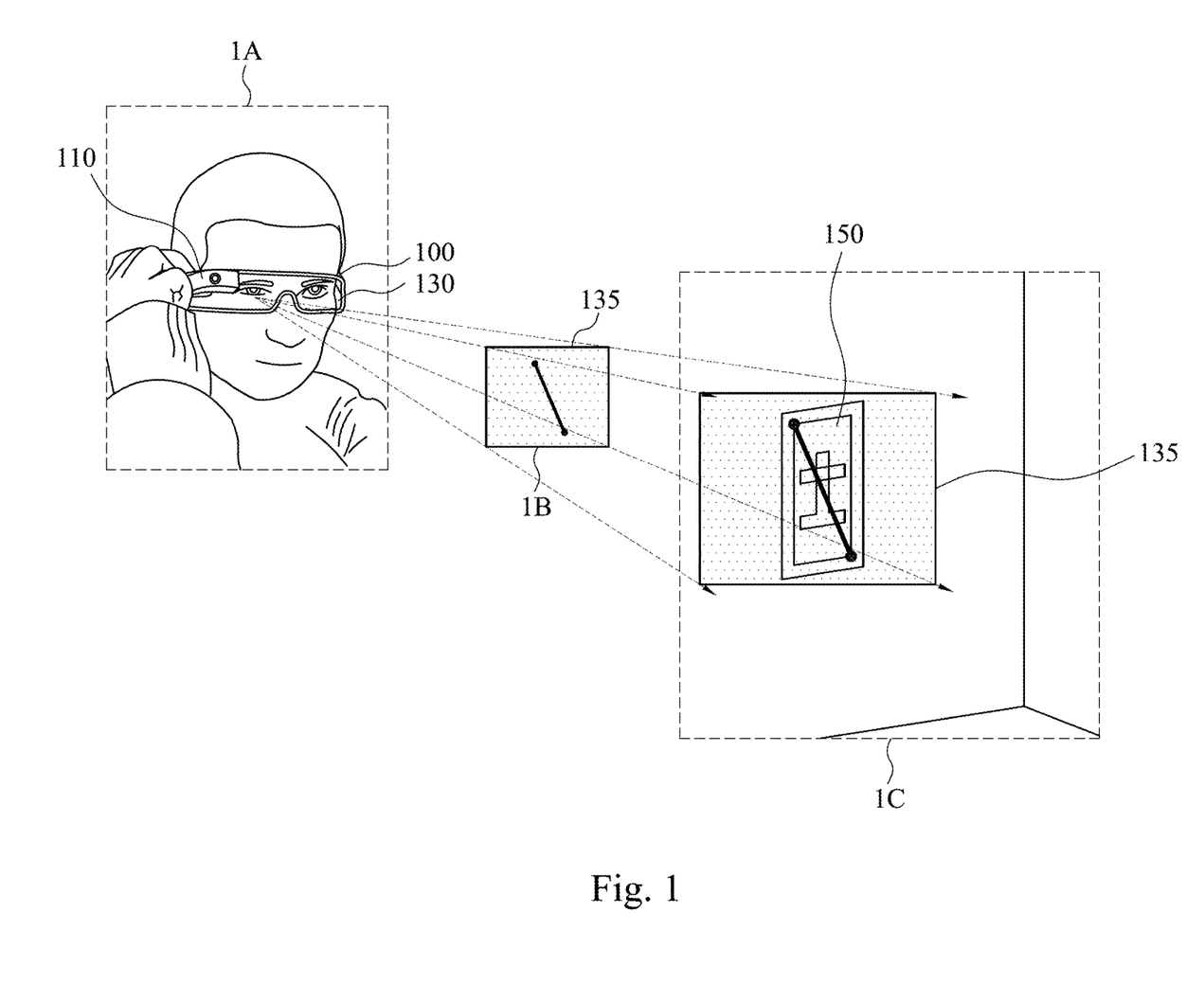
FIG. 1 is a schematic diagram of a traditional head mounted display device calibration.

Reference is made to FIG. 1. FIG. 1 is a schematic diagram of a traditional head mounted display device 100 calibration. As illustrated in picture 1A, the head mounted display device (HMD) 100 includes a camera 110 and a displayer 130. The displayer 130 is a single screen displayer or a dual screen display. The drawn picture 1B is the content displayed on the screen picture 135 of the displayer 130. The picture 1C is the picture with virtual and real overlapped seen by the user in picture 1A through the displayer 130. As illustrated in picture 1C, after the screen picture 135 projected on the entity tag 150, the picture seen by the user includes the screen picture 135 and the entity tag 150 overlapped each other. In the traditional calibration method, the user adjusts the position and the angle, aims and aligns the physical target, and then takes pictures to collect data for calibration by the user himself. In a preferred embodiment, the head mounted display device 100 refers to an optical see-through HMD.

Figure 2:
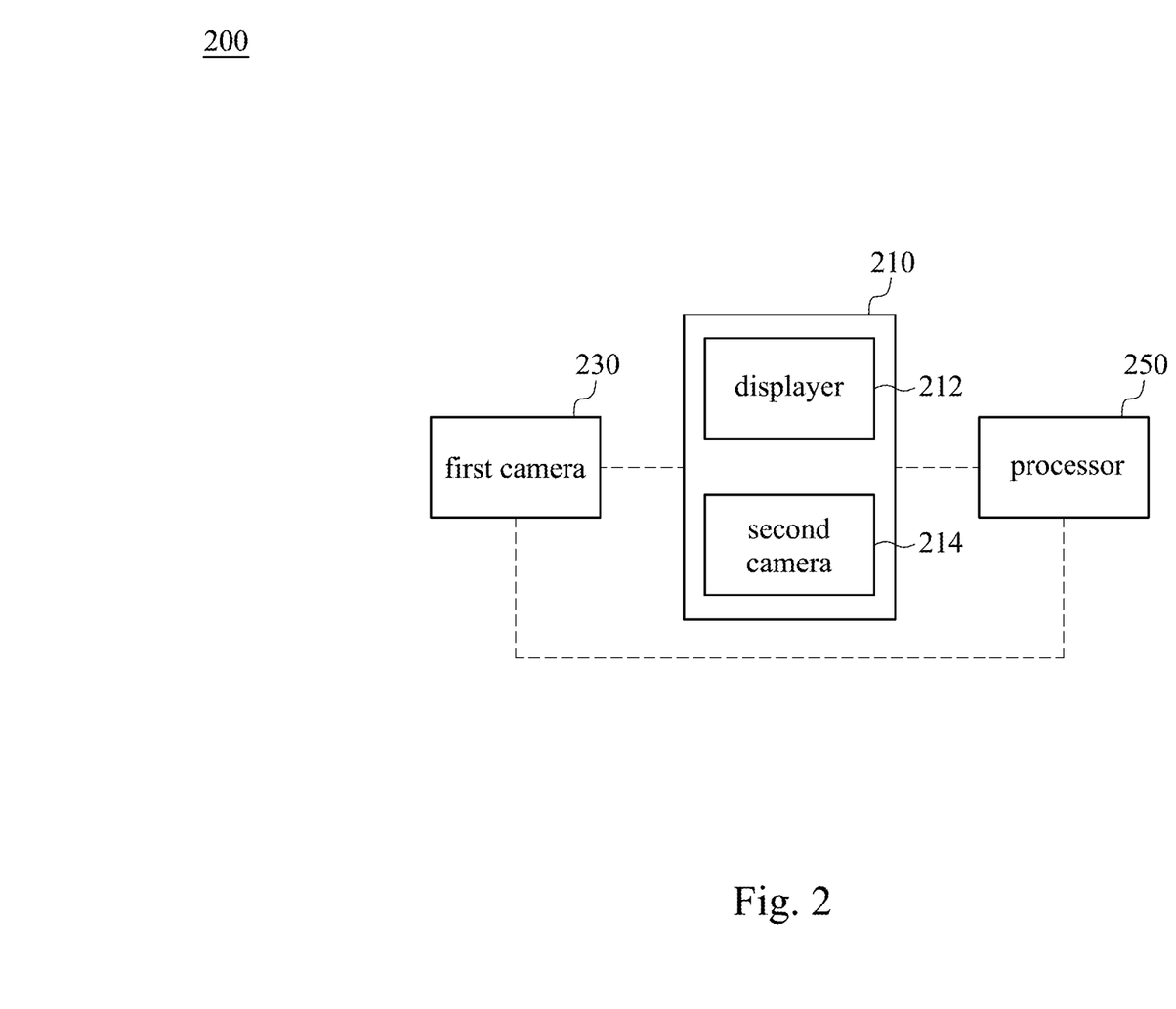
FIG. 2 is a schematic diagram illustrating a virtual and real image fusion system according to some embodiments of the present disclosure.

Reference is made to FIG. 2. FIG. 2 is a schematic diagram illustrating a virtual and real image fusion system 200 according to some embodiments of the present disclosure. As illustrated in FIG. 2, the virtual and real image fusion system 200 includes the head mounted display device 210, the first camera 230, and the processor 250. The head mounted display device 210 includes the displayer 212 and the second camera 214. The displayer 212 is configured to display the screen picture 135. In the connection relationship, the head mounted display device 210 and the first camera 230 are communicatively connected, the first camera 230 and the processor 250 are communicatively connected, and the processor 250 and the head mounted display device 210 are communicatively connected. The virtual and real image fusion system 200 shown in FIG. 2 is for illustrative purposes only, and the embodiments of the present disclosure are not limited thereto. The detailed operation method of virtual and real image fusion system 200 will be explained in reference to FIG. 3 in the following.

Figure 3:
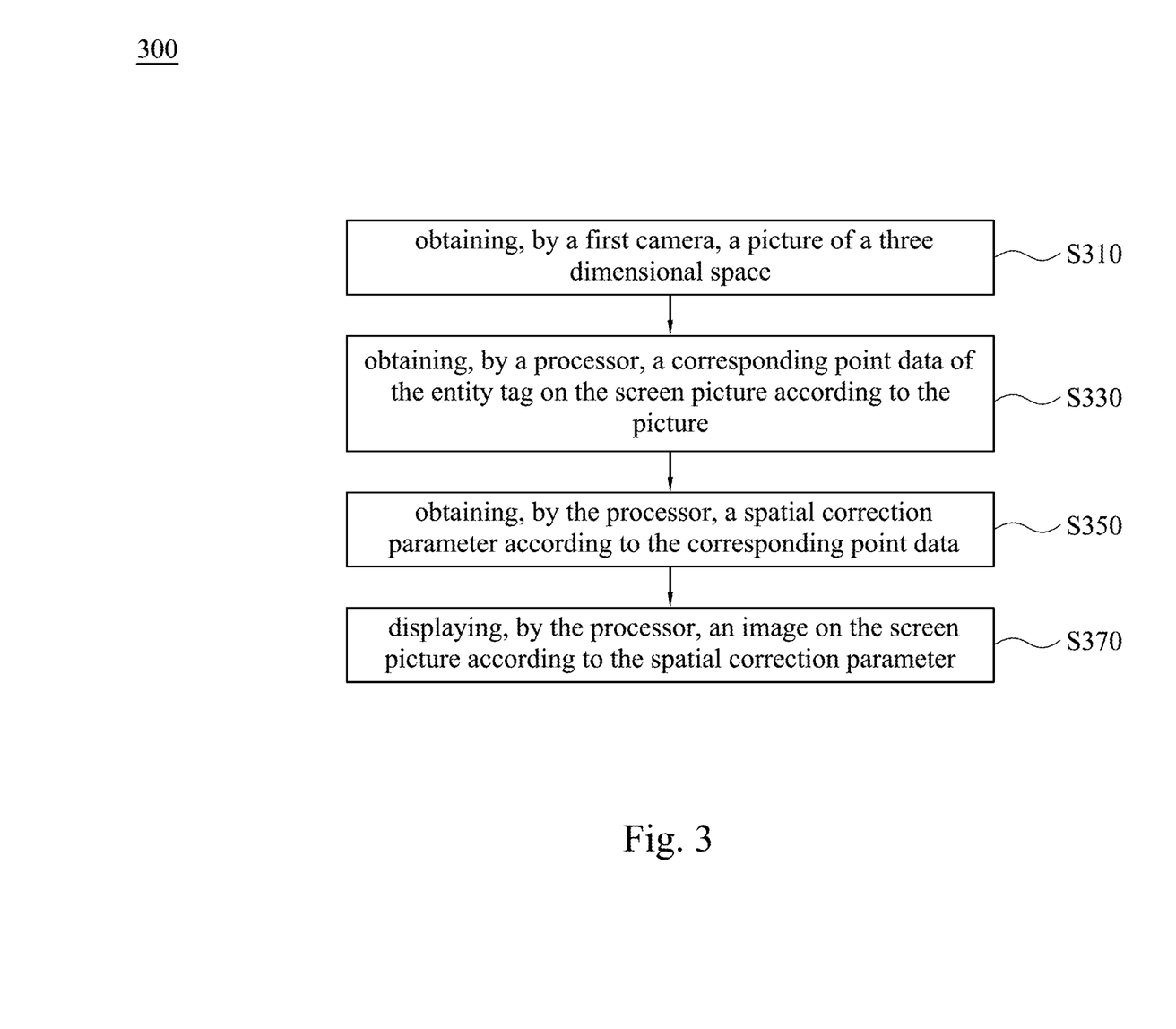
FIG. 3 is a flowchart of a virtual and real image fusion method according to some embodiments of the present disclosure.

Reference is made to FIG. 3. FIG. 3 is a flowchart of a virtual and real image fusion method 300 according to some embodiments of the present disclosure. The embodiments of the present disclosure are not limited thereto.

It should be noted that, the virtual and real image fusion method 300 can be applied to the virtual and real image fusion system 200 that is the same as or similar to the structure as shown in FIG. 2. To simplify the description below, the embodiments shown in FIG. 2 will be used as an example to describe the method according to an embodiment of the present disclosure. However, the present disclosure is not limited to application to the embodiments shown in FIG. 2.

It should be noted that, in some embodiments, the virtual and real image fusion method 300 may be implemented as a computer program, and the computer program is stored in a non-transitory computer readable medium, so that a computer, an electronic device, or the processor 250 in the virtual and real image fusion system 200 in FIG. 2 reads the recording medium and executes the operation method. The processor can be consisted by one or more wafers. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

Furthermore, it should be noted that the operations of the operation method mentioned in the present embodiment can be adjusted according to actual needs except for those whose sequences are specifically stated, and can even be executed simultaneously or partially simultaneously.

Furthermore, in different embodiments, these operations may also be adaptively added, replaced, and/or omitted.

Reference is made to FIG. 3. The virtual and real image fusion method 300 includes the following operations.

Figure 4:
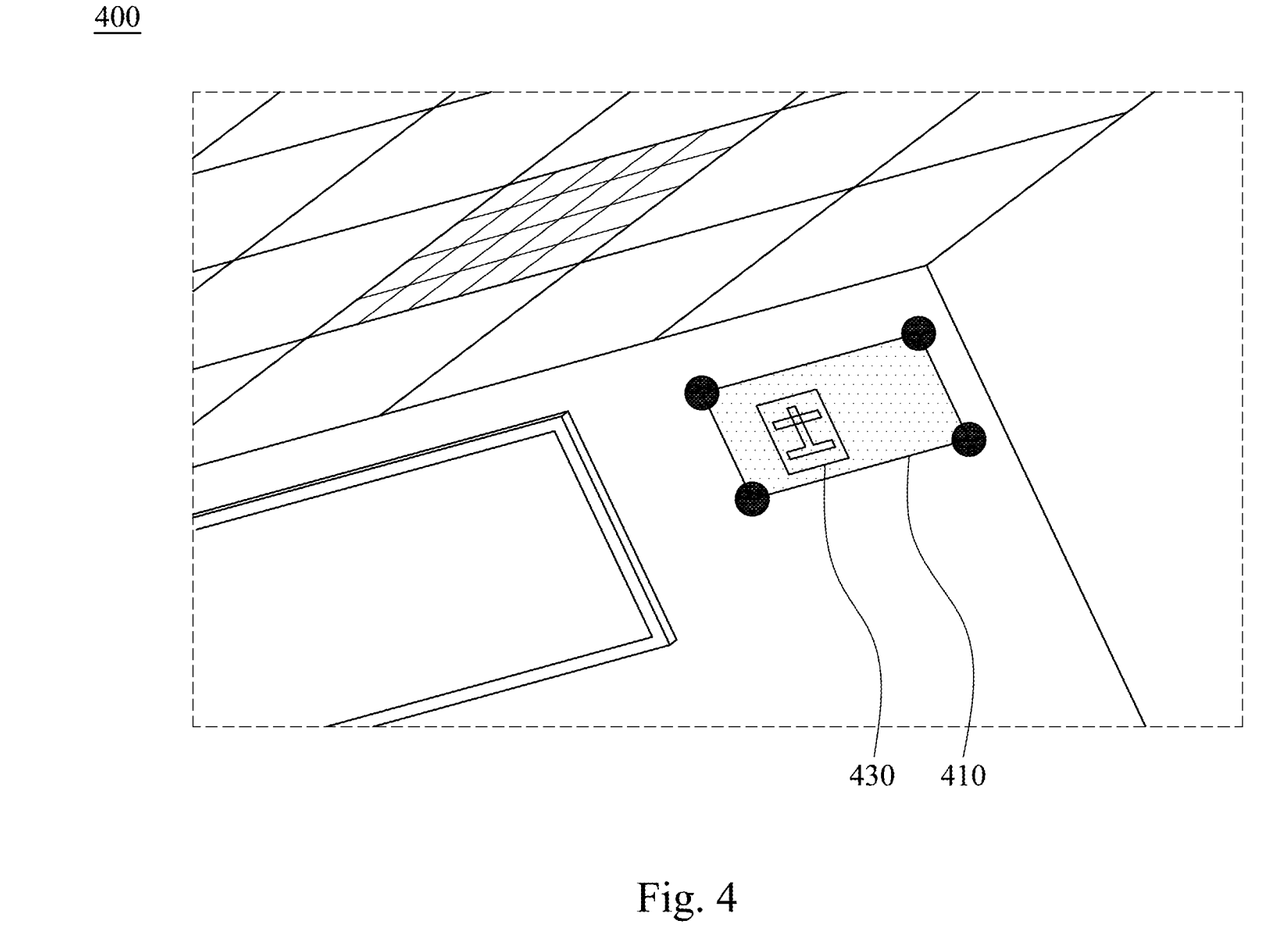
FIG. 4 is a schematic diagram illustrating a picture according to some embodiments of the present disclosure.

In operation S310: a picture of a three dimensional space is obtained by a camera. The picture includes the screen picture and the tag picture of the entity tag. The screen picture is projected on the entity tag. For the method of projecting the screen picture on the entity tag, reference is made to FIG. 1. Various conventional projection methods are also applicable. Reference is made to FIG. 2 together. In some embodiments, operation S310 could be operated by the first camera 230 in FIG. 2. The first camera 230 in FIG. 2 is configured to simulate the eyes of the user. Reference is made to FIG. 4 together. FIG. 4 is a schematic diagram illustrating a picture 400 according to some embodiments of the present disclosure.

As illustrated in FIG. 4. FIG. 4 is the picture 400 in the three dimensional space taken by the first camera 230 via the displayer 212. The picture 400 includes the screen picture 410 and the tag picture of the entity tag 430. The screen picture 410 is the display picture of the displayer 212.

In operation S330, a corresponding point data of the entity tag on the screen picture according to the picture is obtained by a processor. Reference is made to FIG. 2 together. In some embodiments, the operation S330 could be operated by the processor 250 as illustrated in FIG. 2.

Reference is made to FIG. 4 together. After the first camera 230 in FIG. 2 obtains the picture 400, the first camera 230 transmits the picture 400 to the processor 250. In operation S330, after the processor 250 receives the picture 400, the processor 250 performs an anti-distortion conversion process. Due to the difference in the field of view and focal length of the first camera 230, the picture 400 captured by the first camera 230 is deformed. The anti-distortion conversion process is configured to eliminate the effect of the picture 400 from the deformation.

Figure 5:
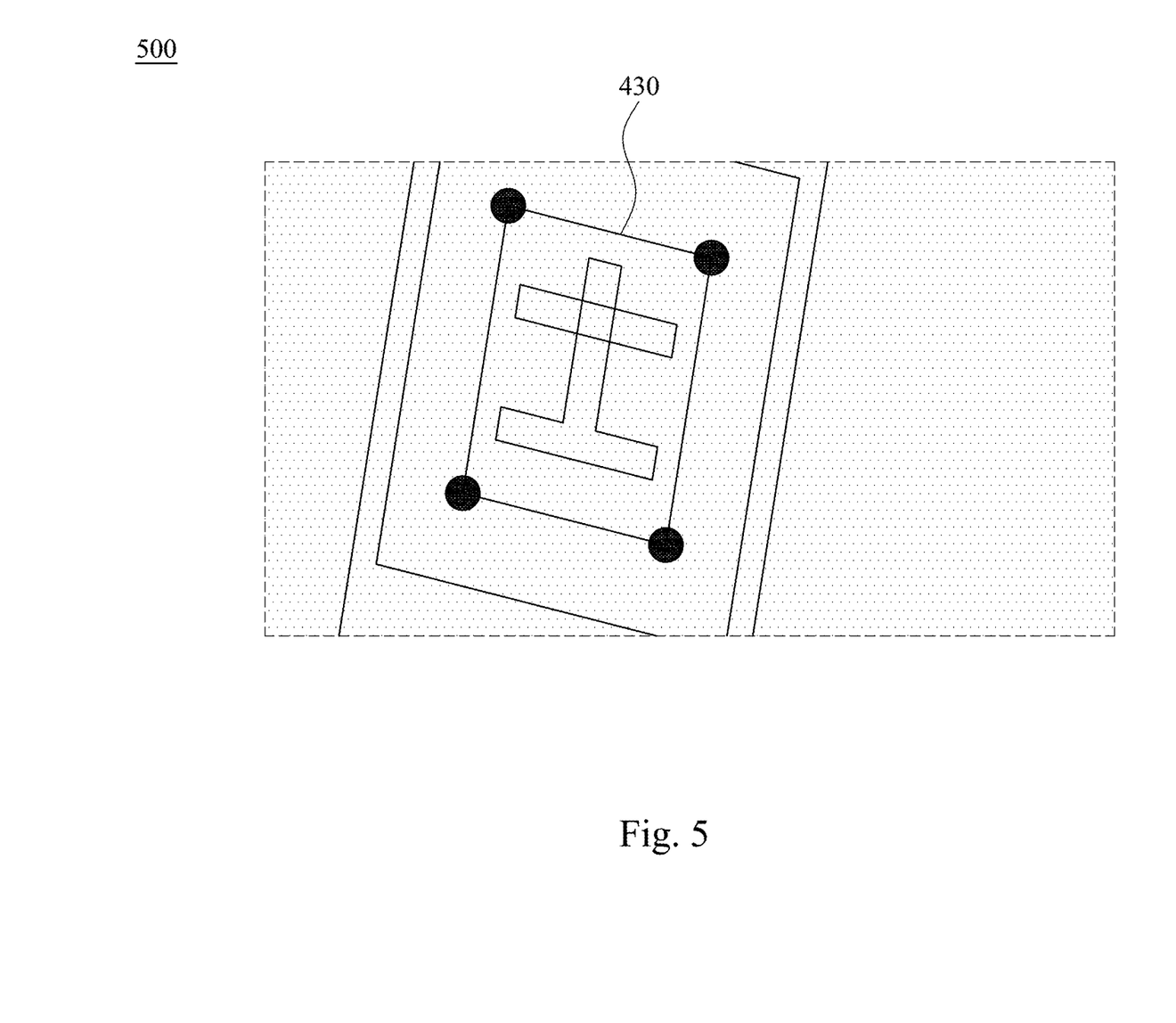
FIG. 5 is a schematic diagram illustrating a screen space picture according to some embodiments of the present disclosure.

Furthermore, in operation S330, the processor 250 also performs a perspective conversion process on the picture 400 to generate a screen space picture 500 as shown in FIG. 5. In some embodiments, the processor 250 obtains the position of the screen picture 410 in the picture 400 so as to perform the perspective conversion process. For example, when the first camera 230 obtains the picture 400, the processor 250 could control the screen picture 410 so that the screen picture 410 displays a single background color or a display frame, so that the processor 250 is able to identify the position of the screen picture 410 in the picture 400. In some embodiments, the positions of the screen picture 410 obtained by the processor 250 are the coordinates of the four corners of the screen picture 410, but the embodiments of the present disclosure are not limited thereto.

Reference is made to FIG. 5 together. FIG. 5 is a schematic diagram illustrating a screen space picture 500 according to some embodiments of the present disclosure. The range of the dotted lines in FIG. 5 is the screen space picture 500. After the processor 250 obtains the position of the screen picture 410, the processor 250 generates the screen space picture 500 according to the screen picture 410.

In some embodiments, during the perspective conversion process, the screen picture 410 should be a rectangular, but after being affected by the distance between the first camera 230 and the displayer 212, the screen picture 410 obtained in the picture 400 becomes a parallelogram. Through the perspective conversion process, the processor 250 converts the screen picture 410 back to a rectangular screen space picture 500.

Next, the processor 250 obtains the position of the tag picture of the entity tag 430 in the screen space picture 500. In some embodiments, the position of the tag picture of the entity tag 430 is the coordinate of the tag picture of the entity tag 430 in the screen space picture 500. For example, the processor 250 obtains the coordinates of the four corners of the tag picture of the entity tag 430 in the screen space picture 500 so as to obtain the position of the tag picture of the entity tag 430.

Next, the processor 250 obtains the corresponding point data according to the position of the tag picture of the entity tag 430 in the screen space picture 500. The corresponding point data is the corresponding value of the entity tag in the three dimensional space corresponding to the position of the screen space picture 500 in the two dimensional space.

Reference is made to FIG. 2 again. In some embodiments, in operation S330, the second camera 214 shoots to obtain the image of the entity tag 430, and transmits the obtained image of the entity tag 430 to the processor 250. After the processor 250 estimates the parameters of the second camera 214, the processor 250 obtains the position of the entity tag 430 relative to the position of the second camera 214 in the three dimensional space according to the image of the entity tag 430 and the parameters of the second camera 214. Since the second camera 214 and the displayer 212 are connected to each other and are located close to each other, the position of the entity tag 430 relative to the position of the second camera 214 in the three dimensional space is similar to the position of the entity tag 430 relative to the displayer 212 in the three dimensional space. When the processor 250 obtains the corresponding point data of the entity tag on the screen picture in the operation S330, the processor 250 generates the corresponding point data according to the position of the entity tag 430 relative to the position of the second camera 214 in the three dimensional space.

In operation S350, a spatial correction parameter is obtained according to the corresponding point data by the processor. In some embodiments, operation S350 is operated by the processor 250 as shown in FIG. 2. In some embodiments, the processor 250 obtains the spatial correction parameter by the singular value decomposition operation according to the corresponding point data obtained in operation S330. In some embodiments, the singular value decomposition operation adopts the conventional singular value operation method.

Figure 6:
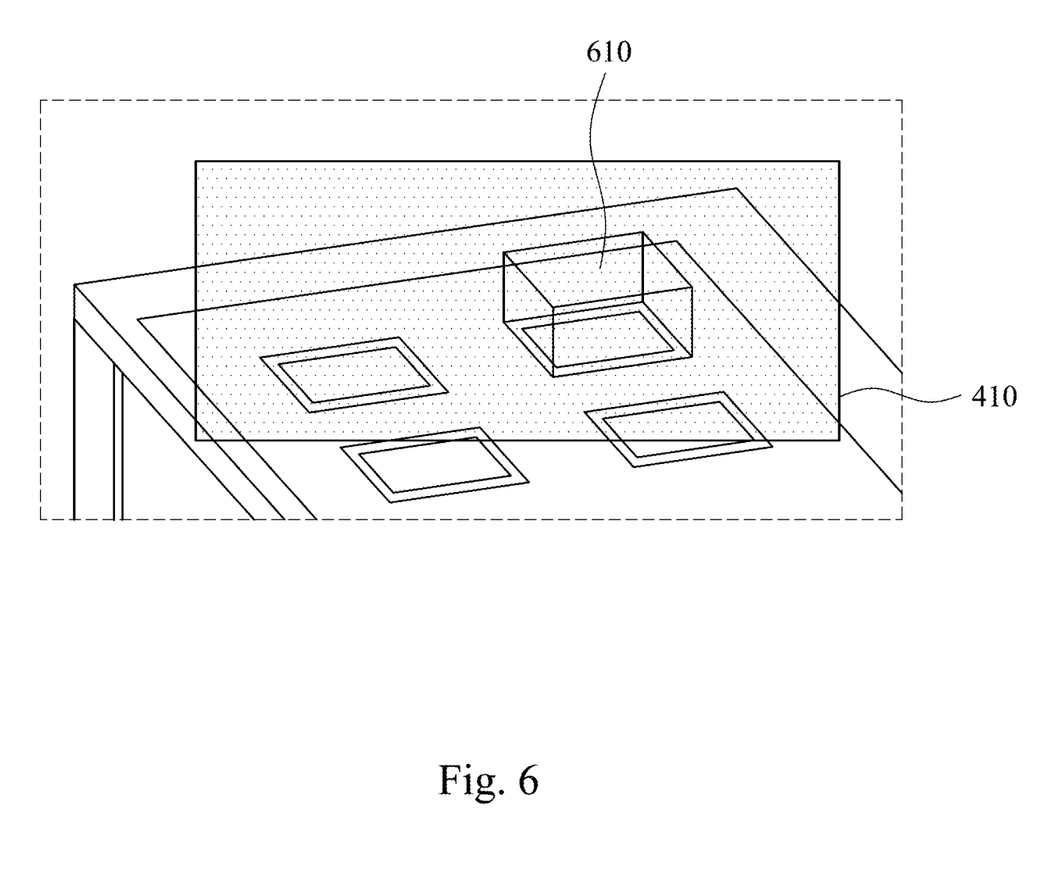
FIG. 6 is a schematic diagram illustrating a screen picture according to some embodiments of the present disclosure.

In operation S370, an image is displayed on the screen picture according to the spatial correction parameter by the processor. In some embodiments, operation S370 is operated by the processor 250 as shown in FIG. 2. For example, reference is made to FIG. 6 together. FIG. 6 is a schematic diagram illustrating a screen picture 410 according to some embodiments of the present disclosure. As shown in FIG. 6, the processor 250 displays the cuboid 610 on the screen picture 410 of the display 212 in FIG. 2 according to the spatial correction parameter. According to the spatial correction parameter, the processor 250 makes the cuboid 610 display in the place that is expected to overlap with the real space. When the user uses the head mounted display device 210, the image that the user sees through the displayer 212 is as shown in FIG. 6.

In some embodiments, the processor 250 may be located in a mobile phone, a server, or other devices. In some embodiments, the processor 250 is a server, a circuit, a central processing unit (CPU), or a microprocessor (MCU) with functions such as storage, operation, data reading, signals or messages receiving, and signals or messages transmitting, or other devices with equivalent functions. In some embodiments, the camera 110, the first camera 230, and the second camera 214 are circuits with functions such as image capturing and photographing and other devices with equivalent functions. The first camera 230 includes position and angle adjusters to simulate the position and angle of the human eyes. In some embodiments, the displayer 130 may be a circuit with functions such as image display and other devices with equivalent functions.

The virtual and real image fusion system 200 shown in FIG. 2 is for illustrative purposes only, and the embodiments of the present disclosure are not limited to this. For example, in some embodiments, the processor 250 may be located in the head mounted display device 210.

According to the embodiment of the present disclosure, it is understood that the embodiment of the present disclosure is to provide a virtual and real image fusion method, a virtual and real image fusion system, and a non-transient computer readable medium. The camera is configured to simulate the eyes of a person, and different focal lengths are adjusted through the device. There is no need to adjust manually, and a large amount of data is generated by an automated device. In addition, through the analysis of the image obtained by the camera that simulates human eyes, the position of the entity tag in the image is found. With the traditional camera estimate algorithm, the position of the entity tag of the augmented reality in the three dimensional space is obtained, and the corresponding data between the two dimensional screen space picture and the three dimensional space is established. Then the spatial correction parameter is obtained by the conventional method. After knowing the position of the camera and the position of the object in the three dimensional space, through the spatial correction parameter, the corresponding virtual image is showed on the screen to achieve the effect of superimposing virtual and real.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed, and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A virtual and real image fusion method, comprising:
    obtaining, by a first camera, a picture of a three dimensional space, wherein the picture comprises a screen picture and a tag picture of an entity tag, wherein the screen picture is projected on the entity tag;
    obtaining, by a processor, a corresponding point data of the entity tag on the screen picture according to the picture, further comprising:
        obtaining, by the processor, a position of the screen picture in the picture to perform a perspective conversion process to the picture, so as to generate a screen space picture;
        obtaining, by the processor, a spatial correction parameter according to the corresponding point data; and
        displaying, by the processor, an image on the screen picture according to the spatial correction parameter.

2. The virtual and real image fusion method of claim 1, further comprising:
    performing an anti-distortion conversion process to the picture.

3. The virtual and real image fusion method of claim 1, further comprising:
    obtaining a position of the tag picture of the entity tag in the screen space picture so as to obtain the corresponding point data.

4. The virtual and real image fusion method of claim 1, further comprising:
    displaying a background color or a frame on the screen picture, for the processor to identify the position of the screen picture.

5. The virtual and real image fusion method of claim 1, further comprising:
    performing a singular value decomposition (SVD) operation according to the corresponding point data to obtain the spatial correction parameter.

6. The virtual and real image fusion method of claim 1, further comprising:
    obtaining a position of the entity tag relative to a position of a second camera in the three dimensional space, wherein the screen picture is displayed on a displayer, and the second camera and the displayer are located in a head mounted display device; and
    obtaining the corresponding point data according to the position of the entity tag relative to the position of the second camera in the three dimensional space and the picture captured by the first camera.

7. The virtual and real image fusion method of claim 6, further comprising:
    obtaining an image of the entity tag by the second camera;
    estimating a parameter of the second camera; and
    obtaining the position of the entity tag relative to the position of the second camera in the three dimensional space according to the image of the entity tag and the parameter of the second camera.

8. A virtual and real image fusion system, comprising:
    a displayer, configured to display a screen picture;
    a first camera, configured to obtain a picture of a three dimensional space, wherein the picture comprises a screen picture and a tag picture of an entity tag, wherein the screen picture is projected on the entity tag; and
    a processor, configured to obtain a corresponding point data of the entity tag on the screen picture according to the picture, configured to obtain a spatial correction parameter according to the corresponding point data, and configured to display an image on the screen picture according to the spatial correction parameter;
    wherein the processor is further configured to obtain a position of the screen picture on the picture to perform a perspective conversion process to the picture, so as to generate a screen space picture.

9. The virtual and real image fusion system of claim 8, wherein the processor is further configured to perform an anti-distortion conversion process on the picture.

10. The virtual and real image fusion system of claim 8, wherein the processor is further configured to obtain a position of the tag picture of the entity tag in the screen space picture, so as to obtain the corresponding point data.

11. The virtual and real image fusion system of claim 8, wherein the processor is further configured to display a background color or a frame on the screen picture, for the processor to identify the position of the screen picture.

12. The virtual and real image fusion system of claim 8, wherein the processor is further configured to perform a singular value decomposition operation according to the corresponding point data to obtain the spatial correction parameter.

13. The virtual and real image fusion system of claim 8, wherein the processor is further configured to obtain a position of the entity tag relative to a position of a second camera in the three dimensional space, wherein the second camera is relative to the screen picture, and to obtain the corresponding point data according to the position of the entity tag relative to the position of the second camera in the three dimensional space and the picture captured by the first camera.

14. The virtual and real image fusion system of claim 13, further comprising:
    a second camera, configured to obtain an image of the entity tag;
    wherein the processor is further configured to estimate a parameter of the second camera, and to obtain the position of the entity tag relative to the position of the second camera in the three dimensional space according to the image of the entity tag and the parameter of the second camera.

15. The virtual and real image fusion system of claim 14, wherein the displayer and the second camera are located in a head mounted display device, and the displayer and the second camera are communicatively connected to the processor and the first camera.

16. A non-transient computer readable medium, comprising at least one program command configured to operate a virtual and real image fusion method, the virtual and real image fusion method comprises following operations:
    obtaining, by a processor, a corresponding point data of an entity tag on a screen picture according to a picture, wherein the picture comprises the screen picture and a tag picture of the entity tag, wherein the screen picture is projected on the entity tag, further comprising:
        obtaining, by the processor, a position of the screen picture on the picture to perform a perspective conversion process to the picture, so as to generate a screen space picture;
    obtaining a spatial correction parameter according to the corresponding point data; and
    displaying an image on the screen picture according to the spatial correction parameter.

17. The non-transient computer readable medium of claim 16, wherein the virtual and real image fusion method further comprises:
    performing an anti-distortion conversion process to the picture.

18. The non-transient computer readable medium of claim 16, wherein the virtual and real image fusion method further comprises:

obtaining a position of the tag picture of the entity tag in the screen space picture, so as to obtain the corresponding point data.

* * * * *